July 11, 1939.  S. J. FISHER  2,165,699

RETAINING DEVICE

Filed Feb. 28, 1938

INVENTOR.
Stanley J. Fisher
BY
ATTORNEY.

Patented July 11, 1939

2,165,699

UNITED STATES PATENT OFFICE 2,165,699

RETAINING DEVICE

Stanley J. Fisher, Downey, Calif.

Application February 28, 1938, Serial No. 193,164

22 Claims. (Cl. 74—600)

This invention relates to a retaining device for preventing looseness of a nut or bolt or similar element, and particularly to retaining devices used in conjunction with crank and wrist pin mechanisms in which a detachable wrist pin is rigidly secured to a crank arm by means of a threaded element.

In well drilling and pumping mechanisms a crank and pitman is usually provided for oscillating a walking beam. The crank pin passes through any one of a number of openings in the crank arm, reliance being had upon a single nut threaded onto said pin for securing it to the arm. Due to vibratory forces attending the actuation of the mechanism this nut has a tendency to work loose, which will increase the vibration between the pin and crank arm, finally resulting in either a complete removal of the nut or a crystallization or breaking of the pin.

Accordingly, it is an object of this invention to provide a device which can prevent turning of a nut, bolt, or similar element, by cooperating with a face thereof in any one of various angular positions which said face may assume.

Another object of the invention is the provision of a device for effecting the retention of a wrist pin on a crank arm having a plurality of holes for the selective reception of portions of said device.

This invention possesses many other advantages and has other objects which will be made more easily apparent from a consideration of the embodiment thereof shown in the accompanying drawing and forming a part of the present specification. I shall now proceed to describe this form in detail which illustrates the general principles of my invention; but it is to be understood that this description is not to be taken in a limiting sense, since the scope of the invention is best defined by the appended claims.

Figure 3:
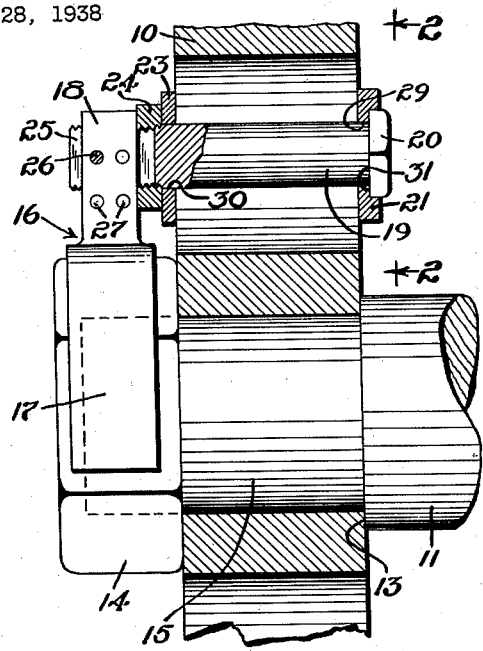
Figure 3 is a vertical sectional view (partly in elevation), taken as indicated by line 3—3 of Figure 1.

The embodiment of the invention disclosed in the drawing is shown as being applied to a crank arm 10 carrying a wrist pin 11 held in one of a number of openings 12 in the crank arm. By the provision of the plurality of openings the stroke of the pitman (not shown) mounted on the wrist pin 11 may be varied, in a well known manner. The wrist pin 11 is held rigidly upon the crank arm 10 by the abutting of a shouldered portion 13 (Figure 3) against one face of the arm and by a nut 14 abutting against the other face of the arm, which nut is threaded onto the reduced end 15 of the wrist pin.

Heretofore, the nut 14 has been held upon the wrist pin 11 solely by relying upon the tightening effect made possible through the use of a long wrench. In an attempt to ensure against loosening of the wrist pin on the crank arm, the tendency of the workmen has been to turn the nut to such an extent as to overstress the wrist pin, in many instances producing its failure. The retaining device contemplated by the present invention obviates the necessity for going to such extremes in attempting to prevent looseness of the nut and wrist pin, while positively ensuring their maintenance in tight relationship with respect to each other and also the crank arm.

The retaining device includes a yoke 16 whose legs 17 are adapted to engage with the polygonal sides of an element such as the nut 14 in threaded relationship with the wrist pin. For the purpose of preventing movement of the yoke 16 and consequently of the nut 14 engaged by its leg portions 17, the yoke is provided with an arm 18 which is secured to the crank arm 10 through the agency of anchoring means, which will hereafter be described.

The anchoring means comprises a bolt 19 which is adapted to pass through one of the holes 12 in the crank arm, said bolt having at one end a polygonal headed portion 20 adapted to engage with a plate 21 having inturned portions 22 engageable with the side edges of the crank arm 10. The bolt 19 passes through a corresponding second plate 23 on the opposite face of the crank arm, and serves to rigidly clamp the plates to the crank arm by means of the nut 24 threaded onto the bolt 19 and engageable with the second plate 23. The threaded end of the bolt 19 is provided with a slot 25 receiving the yoke arm 18, which is held therein by the cotter key 26 passing through aligned bores in the bolt and a selected bore 27 in the arm. By the anchoring means described, the yoke 16 is held in fixed position with respect to the crank arm 10, and because of the engagement of the yoke legs 17 with the side faces of the nut 14, said nut is similarly held in fixed position with respect to the crank arm, being prevented from turning upon the wrist pin.

Figure 1:
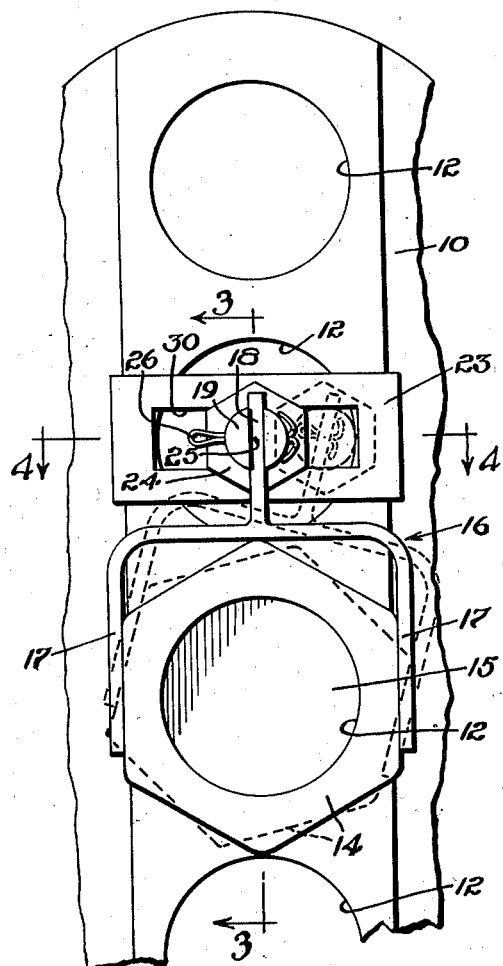
Figure 1 shows a crank and wrist pin construction embodying the present invention.
Figure 4:
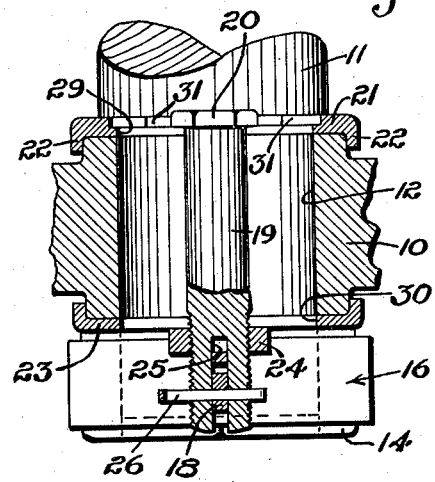
Figure 4 is a transverse sectional view taken as indicated by line 4—4 of Figure 1.
Figure 2:
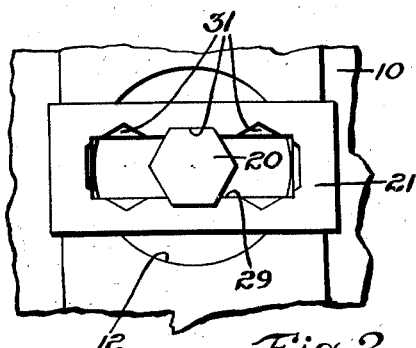
Figure 2 is a fragmentary elevation taken as indicated by line 2—2 of Figure 3.

It will be noted that the anchor plates 21 and 23 are provided with respective slots 29 and 30. This is for the purpose of permitting the retaining device to accomplish its locking function regardless of the angular position assumed by the nut faces upon its being tightened on the wrist pin. The full line position of the wrist pin nut and retaining device is only one of a number of positions which may be assumed by these members. Upon being tightened, the nut 14 might assume the dotted line position (Figure 1), which would require the movement of the anchor bolt 19, longitudinally of the plate slots 29 and 30 to its dotted line position, wherein the bolt slot 25 would be turned angularly from the full line position to accommodate the change in angularity of the yoke arm 18, caused by a corresponding change in position of the yoke legs 17 in their engagement with the polygonal faces of the wrist pin nut.

Thus, the wrist pin nut 10 may assume an infinite number of positions, and the retaining device will still be capable of preventing its turning, simply by movement of the anchor bolt 19 longitudinally of the plate slots 29 and 30. The holes 12 in the crank arm 10 provided for the purpose of selective insertion of the wrist pin, will permit such movement of the anchor bolt. For that matter, the retaining device could be inverted from the position shown, so that the anchor bolt 19, could be accommodated by the crank arm hole below that containing the wrist pin.

As assurance against inadvertent movement of the anchor bolt longitudinally of the plate slots, and to properly determine and maintain the angular position of the anchor bolt slot 25 so that it can properly receive the yoke arm 18, the plate 21 is provided with a plurality of recesses 31, having sides corresponding to the polygonal sides of the anchor bolt head 20. The sides of the end recesses are angularly disposed with respect to those of the central recesses to receive the bolt head and position the bolt so that its slot 25, is in proper angular position for reception of the yoke arm 18. Should tightening of the wrist pin nut 14 result in misalignment of the yoke arm 18, and anchor bolt slot 25, the necessary compensation to bring them into alignment may be effected, by moving the anchor plates 21 and 33 and bolt 19 to or from the wrist pin nut 14. Here again, the holes 12 in the crank arm will readily permit such motion.

I claim:

1. A retaining device for use in connection with wrist pin construction in which the pin is held rigidly in a crank arm by means of a nut threaded onto the pin, said device including means for engaging said nut, said means having an arm extending therefrom, anchor means including a slotted member adapted to be rigidly secured to the crank arm, said anchor means including an element adjustable in said slot and having a slotted portion for receiving said extended arm, and means for positively connecting said element and arm.

2. A retaining device for use in connection with wrist pin construction in which the pin is held rigidly in a crank arm by means of a nut threaded onto the pin, said device including means for engaging said nut, said means having an arm extending therefrom, anchor means including a slotted member adapted to be rigidly secured to the crank arm, said anchor means including an element adjustable in said slot and provided with a slot for receiving said extended arm, and a cotter passing through said element and extended arm.

3. A retaining device for use in connection with wrist pin construction in which the pin is held rigidly in a crank arm by means of a nut threaded onto the pin, said device including means for engaging said nut, said means having an arm extending therefrom, a pair of plates adapted for engagement with opposite sides of the crank arm, means including an element for rigidly attaching said plates to said arm, said element being provided with means for receiving said extended arm.

4. A retaining device for use in connection with wrist pin construction in which the pin is held rigidly in a crank arm by means of a nut threaded onto the pin, said crank arm being provided with an opening, said device including means for engaging said nut, said means having an arm extending therefrom, a pair of plates adapted for engagement with opposite sides of the crank arm, means including an element passing through said opening for clamping said plates to said crank arm, said element being provided with means for receiving said extended arm, and means associated with said plates whereby said element can occupy different positions with respect to said crank arm to accommodate said extended arm in various positions.

5. A retaining device for use in connection with wrist pin construction in which the pin is held rigidly in a crank arm by means of a nut threaded onto the pin, said crank arm being provided with an opening, said device including means for engaging said nut, said means having an arm extending therefrom, a pair of plates adapted for engagement with opposite sides of the crank arm, means including an element passing through said opening for clamping said plates to said crank arm, said element being provided with a slot for receiving said extended arm, and means associated with said plates whereby said slot can occupy different angular positions with respect to said crank arm to accommodate said extended arm in corresponding positions.

6. A retaining device for use in connection with wrist pin construction in which the pin is held rigidly in a crank arm by means of a nut threaded onto the pin, said crank arm being provided with an opening, said device including means for engaging said nut, said means having an arm extending therefrom, a pair of plates adapted for engagement with opposite sides of the crank arm, means including an element passing through said opening for clamping said plates to said crank arm, said element being provided with means for receiving said arm and permitting it to occupy different positions with respect to said crank arm to accommodate said extended arm in various positions.

7. A retaining device for use in connection with wrist pin construction in which the pin is held rigidly in a crank arm by means of a nut threaded onto the pin, said crank arm being provided with an opening, said device including means for engaging said nut, said means having an arm extending therefrom, a pair of plates adapted for engagement with opposite sides of the crank arm, means including a polygonally headed bolt passing through said opening for clamping said plates to said crank arm, said bolt being provided with means for receiving said extended arm, said plates having slots receiving said bolt and permitting it to occupy different positions with respect to said crank to accommodate said extended arm in various positions, one of said plates being provided with recesses for receiving the head of said bolt and holding said bolt in one of said positions.

8. A nut locking device including means for engaging a nut, said means having an extension, means adapted to be anchored substantially in proximity to a nut, said means including an element having a slotted portion for receiving said extension, and means adjustably receiving said element.

9. A nut locking device including means for engaging a nut, said means having an extension, means adapted to be anchored substantially in proximity to a nut, said means including an adjustable element having a slotted portion to accommodate said extension in different positions.

10. A nut locking device including means for engaging a nut, said means having an extension, a pair of plates, anchor means adjustable in said plates, said anchor means including means for engaging said extension.

11. A nut locking device including means for engaging a nut, said means having an extension, anchor means having means for engaging said extension, means providing a slot adjustably receiving said anchor means, said means having means for receiving a portion of said anchor means for holding said anchor means in different adjusted positions in said slot.

12. A wrist pin construction comprising a crank arm having a plurality of holes, a wrist pin selectively positioned in one of said holes, a nut threaded onto said pin for rigidly holding the same on said crank arm, means engaging said nut and having an extension, and anchor means rigidly secured to the crank arm, said anchor means including an element passing through another of said crank holes and having a portion therein for receiving said extension.

13. A wrist pin construction comprising a crank arm having a plurality of holes, a wrist pin selectively positioned in one of said holes, a nut threaded onto said pin for rigidly holding the same on said crank arm, means engaging said nut and having an extension, a pair of plates mounted on opposite sides of the crank arm, and means receivable by said plates and passing through another of said crank holes, said means securing said plates to said crank arm and having means engageable with said extension.

14. A wrist pin construction comprising a crank arm having a plurality of holes, a wrist pin selectively positioned in one of said holes, a nut threaded onto said pin for rigidly holding the same on said crank arm, means engaging said nut and having an extension, a pair of plates mounted on opposite sides of the crank arm, and means passing through another of the crank holes, said means being adjustable in said plates and having means engageable with said extension.

15. A wrist pin construction comprising a crank arm having a plurality of holes, a wrist pin selectively positioned in one of said holes, a nut threaded onto said pin for rigidly holding the same on said crank arm, means engaging said nut and having an extension, a pair of plates mounted on opposite sides of the crank arm, and means passing through another of the crank holes, said means being adjustable in said plates and having means engageable with said extension, one of said plates having means for holding said element in different positions of adjustment.

16. A retaining device including means engageable with a threaded element secured to an object, said means having an extension, means adapted to be mounted on the object and provided with a slot, and means adjustable in said slot, said means having means associated therewith for holding said extension in different positions.

17. A nut retaining device including locking means engageable with a nut and having an extension, means having a slot, means adapted to anchor said first means near the surface against which the nut is adapted to bear and including an element adjustable in said slot, and means on said element cooperating with said extension to secure the same together.

18. A nut retaining device including locking means engageable with a nut and having an extension, means having a slot, means adapted to anchor said first means near the surface against which the nut is adapted to bear and including an element adjustable in said slot in the direction of the slot length, and means on said element cooperating with said extension to secure the same together.

19. A locking device for a nut employed to secure a threaded element to an object, including means adapted to engage the nut, a pair of plates adapted to be mounted on opposite sides of the object, and anchor means associated with said plates to secure the same to the object and including means engageable with said nut engaging means.

20. A nut retaining device including locking means engageable with a nut and having an extension, means having a slot, means adapted to anchor said first means near the surface against which the nut is adapted to bear and including an element adjustable in said slot in the direction of the slot length, means on said element cooperating with said extension to secure the same together, and means for holding said element in different adjusted positions in said slot.

21. A nut retaining device including locking means engageable with a nut and having an extension, means having a slot, means adapted to anchor said first means near the surface against which the nut is adapted to bear and including an element angularly adjustable in said slot, and means on said element cooperating with said extension to secure the same together.

22. A nut retaining device including locking means engageable with a nut and having an extension, means having a slot, means adapted to anchor said first means near the surface against which the nut is adapted to bear and including an element angularly adjustable in said slot, means on said element cooperating with said extension to secure the same together, means for holding said element in different angular positions within said slot.

STANLEY J. FISHER.